(12) United States Patent
Trentler et al.

(10) Patent No.: US 7,521,154 B2
(45) Date of Patent: Apr. 21, 2009

(54) HOLOGRAPHIC STORAGE MEDIA

(75) Inventors: Timothy Trentler, Longmont, CO (US); Melinda Schnoes, Longmont, CO (US); Michael Coles, Longmont, CO (US); Xuan Phan, Raleigh, NC (US)

(73) Assignee: Inphase Technologies, Inc., Longmont, CO (US)

(*) Notice: Subject to any disclaimer, the term of this patent is extended or adjusted under 35 U.S.C. 154(b) by 85 days.

(21) Appl. No.: 10/411,380

(22) Filed: Apr. 11, 2003

(65) Prior Publication Data

US 2004/0027625 A1 Feb. 12, 2004

Related U.S. Application Data

(60) Provisional application No. 60/371,407, filed on Apr. 11, 2002, provisional application No. 60/371,408, filed on Apr. 11, 2002.

(51) Int. Cl.
*G03H 1/02* (2006.01)
(52) U.S. Cl. ................ 430/1; 430/2; 359/3
(58) Field of Classification Search ............ 430/1, 430/2, 240; 359/3
See application file for complete search history.

(56) References Cited

U.S. PATENT DOCUMENTS

| | | | | |
|---|---|---|---|---|
| 3,668,663 | A | * | 6/1972 | Chandross et al. ........ 365/119 |
| 3,807,999 | A | | 4/1974 | De Schrijver et al. |
| 3,808,443 | A | * | 4/1974 | Chandross et al. ....... 250/484.4 |
| 3,809,732 | A | * | 5/1974 | Chandross et al. .......... 430/321 |
| 3,892,642 | A | | 7/1975 | De Schrijver et al. |
| 4,772,745 | A | * | 9/1988 | Tran-Cong et al. .......... 560/146 |
| 5,023,859 | A | | 6/1991 | Eich et al. |
| 5,219,710 | A | | 6/1993 | Horn et al. |
| 5,292,620 | A | | 3/1994 | Booth et al. |
| 5,384,221 | A | | 1/1995 | Savant et al. |
| 5,750,049 | A | | 5/1998 | Green |
| 5,874,187 | A | | 2/1999 | Colvin et al. |
| 5,932,045 | A | | 8/1999 | Campbell et al. |
| 6,103,454 | A | | 8/2000 | Dhar et al. |
| 6,165,648 | A | | 12/2000 | Colvin et al. |
| 6,268,089 | B1 | | 7/2001 | Chandross et al. |
| 6,359,150 | B1 | | 3/2002 | Fukudome et al. |
| 6,359,160 | B1 | | 3/2002 | Sun et al. |
| RE37,658 | E | | 4/2002 | Green |
| 6,376,655 | B1 | | 4/2002 | Berg et al. |

(Continued)

FOREIGN PATENT DOCUMENTS

EP 403739 * 12/1990

(Continued)

OTHER PUBLICATIONS

Tran-Cong et al., "Structure and polymer blends of photo-cross-linked during the spinodal decomposition process" Macromolecules vol. 24. pp. 1505-1510 (1991).*

(Continued)

*Primary Examiner*—Martin J Angebranndt
(74) *Attorney, Agent, or Firm*—Morrison & Foerster LLP

(57) ABSTRACT

Described are holographic storage mediums and method of making holographic storage mediums. The holographic storage mediums may have write components that bind to the matrix to form a pattern in the media. The holographic storage mediums may also be rewriteable.

53 Claims, 8 Drawing Sheets

U.S. PATENT DOCUMENTS 6,500,510 B1    12/2002    Sanders et al.
2002/0025401 A1    2/2002    Berg et al.

FOREIGN PATENT DOCUMENTS

| EP | 1 022 625 | | 7/2000 |
|---|---|---|---|
| JP | 61-169838 | * | 7/1986 |
| JP | 2-251841 | | 10/1990 |

OTHER PUBLICATIONS

Winnik et al., "Energy transfer studies from polymer bound naphthalene to anthracene in solution: translational and segmental diffusion rates", Polymer vol. 25, pp. 1767-1773 (1984).*

Albini et al., "Adabatic and charge transfer pathways of dimmers and cyclodducts of some aromatic molecules", J. Am. Chem. Soc., vol. 110(23) pp. 7760-7763 (1988).*

Ide et al., "Gelation processes of polymer solutions. 1 photodimerization of free and polymer bound anthryl groups", Macromolecules, vol. 29 pp. 3851-3856 (1996).*

Bouas-Laurent et al., Photodimerization of anthracenes in fluid solution :Structural aspects, Chem. Soc. Rev., vol. 29 pp. 43-55 (2000).*

Trans-Cong et al. Immobilization of transient . . . , Macromolecules vol. 22 pp. 2720-2773.*

Merck Index, tenth Edition, pp. 4-5 (1983).*

Bratschkov et al. "Syntheses and photochemical transformations of anthracene containing methacrylic acid copolymer", Polym. Bull. vol. 46 pp. 345-349.*

Paul et al., "An anthracene containing PMMA derivative for photoresist and channel waveguide applications", Thin Solid Films., vol. 248 p. 150-154 (1996).*

Hargreaves et al., "Photophysics of anthracene polymers" fluorescence, singlet . . . Macromol. vol. 17 pp. 235-240 (1984).*

Lashkov et al, Dokl Akad. Nauk SSSR vol. 214(4) pp. 850-853 (1974).*

Kozel et al., Analysis of the spectral-luminescent properties of poly-(9-anthrylmethyl methacrylate) . . . . , Opt. Spectrosc. vol. 48(6) pp. 607-611 (Jun. 1980).*

Kozel et al., Nature of the hypochorme effect in electronic . . . , Opt. Spectrosk., vol. 48(5) pp. 890-895 (1980).*

Pokorna et al., "Study of macromolecule chain dynamics in polymers complexes by time resolved fluorescence spectroscopy", J. Floures. 9(1) pp. 59-66 (Mar. 1999).*

Chandross et al. "Absorption and excimer fluoescence spectra of sandwich dimers . . . " J. Chem. Phys., vol. 45(10) pp. 3554-3564.*

Stolka et al., "Polymerization of vinlyantracene monomers . . . ", Macromol. vol. 9(5) pp. 710-714 (Oct. 1975).*

Dhar et al. (2000). "Photopolymers for Digital Holographic Data Storage," *Holographic Data Storage*: 199-207.

Hariharan, P. (1991) "Types of holograms" Chapter 4 In *Optical Holography: Principles, techniques, and applications*. Cambridge Press, pp. 45-67.

Booth, B.L. "Optical Interconnection Polymers," Chapter 9 In *Polymers for Lightwave and Integrated Optics: Technology and Applications*. Lawrence A. Hornak ed., Marcel Dekker, Inc., pp. 231-266.

Ludman et al. (1997). "Very thick holographic nonspatial filtering of laser beams," *Optical Eng.* 36(6): 1700-1705.

Pepper et al. (1990). "The Photorefractive Effect," *Scientific American* 263(4): 62-74.

Murov, Steven L. (1973). *Handbook of Photochemistry*. Marcel Dekker, Inc.: Ney York, Table of Contents.

Smothers et al. (1990). "Photopolymers for Holography," *SPIE: Practical Holography IV* 1212: pp. 20-29.

Solymer & Cooke. (1981). *Vol. Holography & Vol. Gratings*. Academic Press, Table of Contents; pp. 315-327.

Abstract for JP 11-352303.

* cited by examiner

US 7,521,154 B2

HOLOGRAPHIC STORAGE MEDIA

FIELD OF THE INVENTION

This invention relates to holographic storage media. In particular, this invention relates to rewriteable holographic storage media and methods of making rewriteable holographic storage media. In addition, this invention relates to holographic storage media in which binding of chemical species to the matrix occurs during hologram recording.

BACKGROUND

Holographic storage systems are storage systems that use holographic storage media to store data. Holographic storage media includes photorefractive materials that can take advantage of the photorefractive effect described by David M. Pepper et al., in "The Photorefractive Effect," *Scientific American,* October 1990 pages 62-74. The index of refraction in photorefractive materials can be changed by light that passes through them. Holographic storage media also include photopolymers, such as those described in Coufal et al., "Photopolymers for Digital Holographic Storage" in HOLOGRAPHIC DATA STORAGE, 199-207 (2000), and photochromic materials. By controllably changing the index of refraction in such materials, high-density, high-capacity, and high-speed storage of information in holographic storage media can be accomplished.

In the typical holographic storage system, two coherent light beams are directed onto a storage medium. The first coherent light beam is a signal beam, which is used to encode data. The second coherent light beam is a reference light beam. The two coherent light beams intersect within the storage medium to produce an interference pattern. The storage medium records this interference pattern by changing its index of refraction to form an image of the interference pattern.

The recorded information, stored as a holographic image, can be read by illuminating the holographic image with a reference beam. When the holographic image is illuminated with a reference beam at an appropriate angle, a signal beam containing the information stored is produced. Most often the appropriate angle for illuminating the holographic image will be the same as the angle of the reference beam used for recording the holographic image. More than one holographic image may be stored in the same volume by, for example, varying the angle of the reference beam during recording.

Varying the angle of the reference beam during recording to store multiple holographic images in the same volume is called angle multiplexing. In addition to angle multiplexing, other techniques for storing multiple holograms in the same volume include wavelength multiplexing, phase code multiplexing, correlation multiplexing, shift multiplexing, aperture multiplexing, and fractal multiplexing. Since the same volume can be used to store multiple holographic recordings, high storage capacities can be obtained using holographic storage systems.

Information can be encoded within the signal beam in a variety of ways. One way of encoding information into a signal beam is by using an electronic mask, called a spatial-light modulator (SLM). Typically, a SLM is a two dimensional matrix of pixels. Each pixel in the matrix can be directed to transmit or reflect light, corresponding to a binary 1, or to block light, corresponding to a binary 0. The signal beam, once encoded by the SLM, is relayed onto the storage medium, where it intersects with a reference beam to form an interference pattern. The interference pattern records the information encoded in the signal beam to the holographic storage medium.

The information recorded in the holographic storage medium is read by illuminating the storage medium with a reference beam. The resulting signal beam is then typically imaged onto a sensor, such as a Charge Coupled Device (CCD) array or a CMOS active pixel sensor. The sensor is attached to a decoder, which is capable of decoding the data.

FIG. 1 illustrates the basic components of a holographic system 100. System 100 contains a SLM 112, a holographic storage medium 114, and a sensor 116. SLM 112 encodes beam 120 with an object image. The image is stored by interfering the encoded signal beam 120 with a reference beam 122 at a location on or within holographic storage medium 114. The interference creates an interference patterns (or hologram) that is captured within medium 114 as a pattern of, for example, a holographic refractive index grating.

It is possible for more than one holographic image to be stored at a single location, or for a holographic image to be stored at a single location, or for holograms to be stored in overlapping positions, by, for example, varying the angle, the wavelength, or the phase of the reference beam 122, depending on the particular reference beam employed. Signal beam 120 typically passes through lenses 130 before being intersected with reference beam 122 in the medium 114. It is possible for reference beam 122 to pass through lenses 132 before this intersection. Once data is stored in medium 114, it is possible to retrieve the data by intersecting a reference beam 122 with medium 114 at the same location and at the same angle, wavelength, or phase at which a reference beam 122 was directed during storage of the data. The reconstructed data passes through one or more lenses 134 and is detected by sensor 116. Sensor 116, is for example, a charged coupled device or an active pixel sensor. Sensor 116 typically is attached to a unit that decodes the data.

A holographic storage medium includes the material within which a hologram is recorded and from which an image is reconstructed. A holographic storage medium may take a variety of forms. For example, it may comprise a film containing dispersed silver halide particles, photosensitive polymer films ("photopolymers") or a freestanding photorefractive crystal such as iron-doped $LiNbO_3$ crystal.

In the typical photosensitive polymer type holographic storage media, the interference pattern is formed within the media by an irreversible polymerization reaction. In this typical storage media, the matrix does not react during the recording of the hologram to the media. The write components, which are defined as components that react during hologram formation to form the hologram, are separate from the matrix components, which form the matrix. The write components within the matrix, which can include one or more photoreactive monomers, react when exposed to an interference pattern to form a polymer in the exposed regions. The hologram is recorded within the matrix as an index modulation formed between the polymerized write components and the matrix.

The write components can be entirely different chemical compounds than the matrix components. For example, the write components could be chosen so that they react under different conditions than the matrix components. In this way, little reaction of the write components during matrix formation occurs.

Alternatively, the same chemical component can be used as both a matrix component and as a write component. For example, acrylate monomers can be used both as a matrix component, for matrix formation, and as write component, for recording holograms, see for example, U.S. Pat. No. 5,874,187. Although acrylate monomers are used to form both the matrix and to form holograms, the matrix component monomers that react to form the matrix do not substantially react during hologram formation. Although some matrix polymer chains may propagate during hologram writing, the holograph is generally created by new chains that comprise acrylate monomers that are not part of the matrix.

U.S. Pat. No. 6,103,454, entitled RECORDING MEDIUM AND PROCESS FOR FORMING MEDIUM, the disclosure of which is hereby incorporated by reference, generally describes several types of photopolymers for use in holographic storage media. The patent describes an example of creation of a hologram in which a photopolymer is exposed to information carrying light. The matrix components do not substantially react to form a pattern during the recording of the hologram to the media. A monomer, which is not part of the matrix, polymerizes in regions exposed to the light. Due to the lowering of the monomer concentration caused by the polymerization, monomer from darker unexposed regions of the material diffuses to the exposed regions. The polymerization and resulting concentration gradient creates a refractive index change forming a hologram representing the information carried by the light.

W. K. Smothers et al., "Photopolymers for Holography," SPIE OE/Laser Conference, 1212-03, Los Angeles, Calif., 1990, describes a photoimageable system containing a liquid monomer material (the photoactive monomer) and a photoinitiator (which promotes the polymerization of the monomer upon exposure to light), where the photoimageable system is in an organic polymer host matrix that is substantially inert to the exposure light. During writing of information into the material (by passing recording light through an array representing data), the monomer polymerizes in the exposed regions. Due to the lowering of the monomer concentration caused by the polymerization, monomer from the dark, unexposed regions of the material diffuses to the exposed regions. The polymerization and resulting concentration gradient create a refractive index change, forming the hologram representing the data. Again, as in U.S. Pat. No. 6,103,454, the host matrix does not substantially react during hologram formation.

The prior art has been concerned with the formation of holograms in a medium in which the matrix is substantially inert during the formation of a pattern in the medium. A medium in which reaction with the matrix is exploited as the method for pattern formation has, until now, not been achieved.

In addition, rewriteable holographic storage media is being developed. For example, U.S. Reissue Pat. No. 37,658 E, entitled CHIRAL OPTICAL POLYMER BASED INFORMATION STORAGE MATERIAL, describes an optical storage medium in which an optically active polymer is used to store information. The storage medium is optically active at temperatures above Tg and is optically inactive at temperatures below Tg. Information can be repeatedly written to or erased from the optically active polymer by raising the temperature of the optically active medium above Tg. This type of system has the drawbacks of requiring the temperature of the storage medium to be raised above ambient temperatures to store information. Heating of the media can occur by direct absorption of light, however, this can require the use of very high powered lasers and a highly absorptive media.

A storage media that can be used with efficient lasers under ambient conditions and takes advantage of reversible chemical reactions has not yet been achieved.

SUMMARY OF THE INVENTION

This invention relates to optical articles that can be used for holographic storage. The optical articles can include write components that bind to the matrix of the optical article to record a hologram. In another embodiment, optical articles that are rewriteable are disclosed.

In one embodiment the optical article includes a matrix and write components. The write components can be reacted to reversibly bind to the matrix to form a pattern within the optical article when the article is exposed to an interference pattern.

Preferably, the write components include anthracenes or acenaphthylenes. Preferably, the reversible binding of the write components to the matrix is a cycloaddition reaction. Preferably, the binding of the write components to the matrix can be reversed by exposing the optical article to light of a different wavelength than was used to bind the write components to the matrix.

Preferably, the pattern formed within the optical article is a refractive index modulation pattern. Preferably, the matrix comprises an organic, inorganic polymer or glass. Preferably, the matrix contains functional moieties to which the write components can bind when the optical article is exposed to an interference pattern.

Preferably, the write components contain reactive groups that reversibly bind to functional moieties of the matrix when the optical article is exposed to an interference pattern and wherein the proportion of the matrix functional moieties to write component reactive groups within the medium is at least 1:10. Preferably, the optical article contains a photosensitizer that induces the binding of the write components to the matrix. Preferably, the optical article is a holographic storage medium.

Another embodiment is a method of rewriteable pattern formation within an optical article. The method includes writing an interference pattern to the optical article by exposing the optical article to a first interference pattern; flood curing the optical article by exposing the optical article to light; erasing the data by exposing the article to a predefined condition; and rewriting an interference pattern to the optical article by exposing the optical article to a second interference pattern.

Preferably, the predefined condition is the application of heat. Preferably, the optical article has a $\Delta n$ of $3 \times 10^{-3}$ or higher after being exposed to the second interference pattern. Preferably, the optical article is a holographic storage medium.

Another embodiment is a method of manufacturing an optical article. The method of manufacturing the optical article includes mixing a matrix precursor and a write component together and reacting the matrix precursor to form a matrix, wherein the matrix contains functional moieties to which the write component can bind when the optical article is exposed to an interference pattern and wherein the write components can react by reversible cycloadditions.

Yet another embodiment is an optical article that includes a matrix and write components. The write components bind to the matrix to form a pattern when exposed to an interference pattern.

Preferably, the pattern formed within the optical article is a refractive index modulation pattern. Preferably, the matrix comprises an organic or inorganic polymer or glass. Preferably, the matrix contains functional moieties to which the write components can bind when the optical article is exposed to an interference pattern. Preferably, the functional moieties are part of a polymer backbone that forms the matrix. Preferably, the functional moieties are attached to the matrix as pendent groups.

Preferably, the write components contain reactive groups that bind to the functional moieties of the matrix when the optical article is exposed to an interference pattern and wherein the proportion of matrix functional moieties to write component reactive groups within the medium is at least 1:10.

Preferably, the write components contain reactive groups that bind to the functional moieties of the matrix or to another write component. Preferably, the optical article contains a photosensitizer that induces the binding of the write components to the matrix. Preferably, the optical article is a holographic storage medium.

Another embodiment is a method of forming a pattern within an optical article. The method includes exposing an optical article to an interference pattern. The write components within the optical article bind to a matrix to record the interference pattern.

Yet another embodiment is a method of manufacturing an optical article. The method of manufacturing the optical article includes mixing a matrix precursor and a write component together and reacting the matrix precursor to form a matrix, wherein the matrix contains functional moieties to which the write component can bind when the optical article is exposed to an interference pattern.

BRIEF DESCRIPTION OF THE DRAWINGS

The invention will be better understood by reference to the Detailed Description of the Invention when taken together with the attached drawings, wherein.

DETAILED DESCRIPTION OF THE INVENTION

Figure 1:
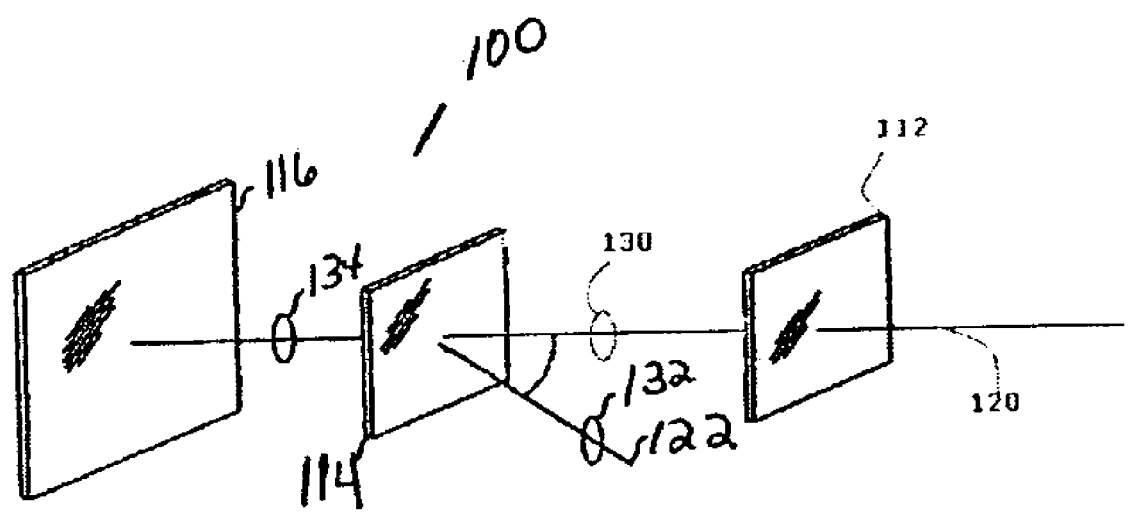
FIG. 1 is a diagram of a conventional holographic storage system.

Described are optical articles, e.g., holographic recording mediums and methods of making holographic storage mediums. Information can be stored within the optical articles in the form of holographic images.

In one embodiment, the holographic images are formed using reversible chemical reactions that allow for the optical article to be erased and/or rewritten multiple times. The optical articles can include one or more matrix components and write components. At least the write components react during hologram formation to form the hologram.

The write components may react during hologram formation by a polymerization reaction in which the write components react with other write components to form a polymer. The write components may also react during hologram formation by attaching to the matrix. Finally, a combination of polymerization and matrix attachment can be employed.

Preferably, some of the write components can bind to the matrix during hologram formation. In an optical article in which hologram formation is accomplished only by polymerization of the write components, considerable diffusion of the write component reaction products may occur subsequent to writing, which can lead to deterioration of the hologram.

In another embodiment, the optical articles include a matrix that contains functional moieties. The functional moieties allow for the attachment of write component species directly to the matrix during hologram formation in the matrix.

Preferred optical articles can be formed according to this invention by steps including mixing one or more matrix components and write components. The mixture may also include other ingredients such as a photosensitizer, plasticizer, cosolvent, and/or other additives. The matrix components are then cured to form a matrix containing the write components. Preferably, the matrix components and the write components are selected such that the write components bind to the matrix components during writing of a pattern to the optical articles.

The matrix can comprise one or more organic or inorganic polymers or glass. Preferably, the matrix is made by combining the matrix components and the write components and then polymerizing the matrix components to form a matrix that encompasses the write components.

Preferably, the matrix is formed in situ from a matrix precursor by a curing step (curing indicating a step of inducing reaction of the precursor to form the polymeric matrix). It is possible for the precursor to be one or more monomers, one or more oligomers, or a mixture of monomer and oligomer. In addition, it is possible for there to be greater than one type of precursor functional group, either on a single precursor molecule or in a group of precursor molecules. (Precursor functional groups are the group or groups on a precursor molecule that are the reaction sites for polymerization during the matrix cure.) To promote mixing with the write components, the precursor is advantageously liquid at some temperature between about −50° C. and about 80° C. Preferably, the matrix polymerization is capable of being performed at room temperature. Also preferably, the polymerization is capable of being performed in a time period less than 5 minutes.

The glass transition temperature ($T_g$) of the optical article is preferably low enough to permit sufficient diffusion and chemical reaction of the write components during writing of data. Generally, the $T_g$ is not more than 50° C. above the temperature at which writing of data is performed, which, for typical holographic recording, means a $T_g$ between about 80° C. and about −130° C. (as measured by conventional methods). A plasticizer may be included to enhance diffusion in a high Tg matrix.

Examples of polymerization reactions contemplated for forming matrix polymers in the invention include cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanatae-amine step polymerization (urea formation), Diels-Alder step polymerization, anionic polymerization of cyanoacrylates and other monomers, free radical polymerization of radically polymerizable monomers/oligomers, and sol-gel reactions to form inorganic or hybrid inorganic/organic networks. Additionally, photoinitiated polymerizations can be used for matrix formations.

Several such reactions are enabled or accelerated by suitable catalysts. For example, cationic epoxy polymerization takes place rapidly at room temperature by use of $BF_3$-based catalysts, other cationic polymerizations proceed in the presence of protons, epoxy-mercaptan reactions and Michael additions are accelerated by bases such as amines, hydrosilylation proceeds rapidly in the presence of transition metal catalysts such as platinum, and urethane and urea formation proceed rapidly when tin catalysts are employed. It is also possible to use photogenerated catalysts for matrix formation, provided that steps are taken to prevent polymerization of the writing component or bonding of the write component to the matrix during the photogeneration of the matrix.

Preferably, the matrix contains functional moieties to which the write components can bind during the writing of the pattern. These functional moieties may be present as part of the polymer backbone that forms the matrix or in pendent groups of the matrix.

Figure 2:
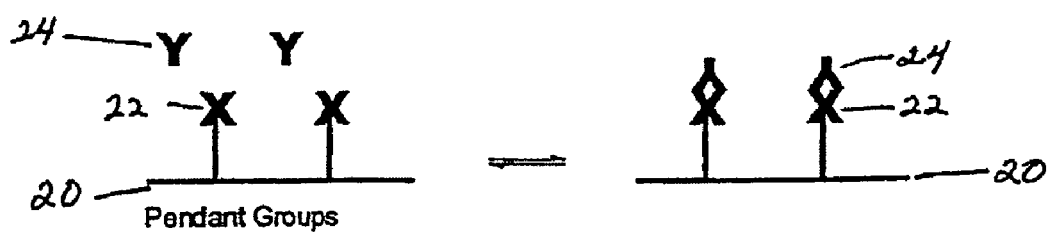
FIG. 2 is a diagram of write components binding to functional moieties that are attached to the polymer backbone of a matrix.

In FIG. 2 functional moieties 22 are attached to the polymer backbone 20 as pendent groups off of the polymer backbone 20. Prior to the writing of the pattern write component 24 is not bonded to the matrix and is able to diffuse through the matrix. During the write phase, write components 24 become attached to exposed locations in the matrix through functional moieties 22.

Figure 3:
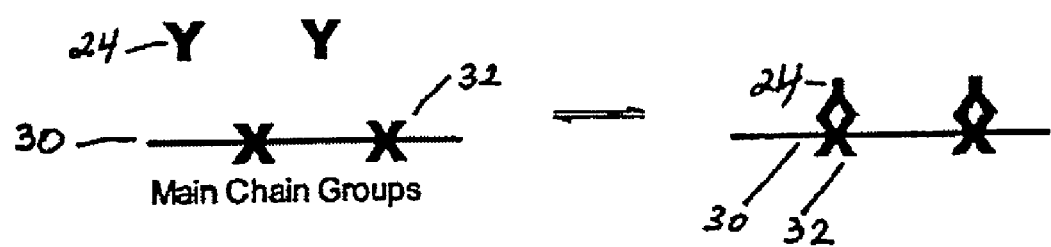
FIG. 3 is a diagram of write components binding to functional moieties that are part of the polymer backbone of a matrix.

In FIG. 3 functional moieties 32 are part of the main chain of the polymer backbone 30. Prior to the writing of the pattern, write components 24 are not bonded to the matrix and are able to diffuse through the matrix. During the write phase, write components 24 become attached to exposed locations in the matrix through functional moieties 32.

The matrix may contain components, for example plasicizers, that do not contribute to producing functional sites for write component attachment. Some plasticizers may not be part of the matrix and may just be free molecules dissolved in the matrix. These matrix components can add desirable characteristics to the matrix including increasing the contrast of images written to the holographic recording mediums. Other desirable characteristics can include, improving the ability of the write component to diffuse through the matrix, contributing to the refractive index variation between the matrix and the write component, and decreasing the time for pattern formation in an optical article.

The write components are one or more chemical species that are unbounded to the matrix, and are preferably free to diffuse through the matrix of the storage medium until data is written to the storage medium. During writing of data, e.g. a hologram, the write components react by binding to functional moieties of the matrix. In a holographic storage system data is written when the write species react in a fashion that matches the interference fringes of intersecting beams. The light absorbing species can be part of a write component, a matrix functional moiety, some other photosensitizer or light absorbing chromophore (can be a free molecule, attached to the matrix, or to a write component, so long as it can transfer absorbed photon energy to the binding groups), or any combination of the above.

The individual write components may react to form one or more bonds with functional moieties of the matrix or with other write components. Some write component species in addition to being able to bond to the matrix may also be able to bond with other write components during writing of a pattern to the medium.

Figure 4:
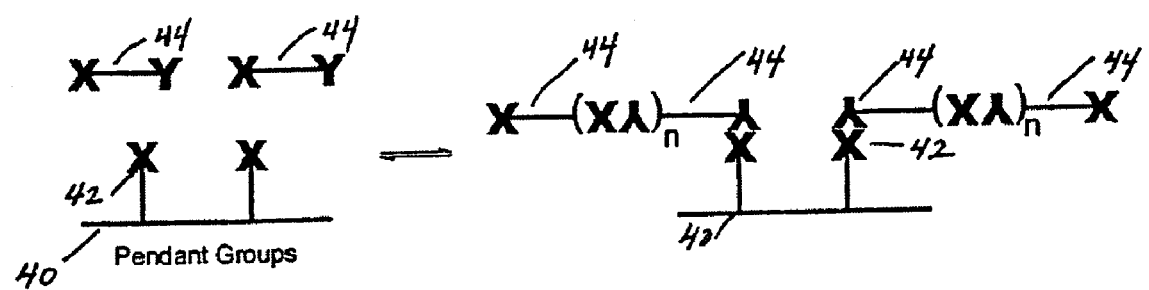
FIG. 4 is a diagram of a multifunctional write component that can bind to functional moieties that are attached to the matrix or to other write components.

The write components may comprise one or more reactive groups that bond to the matrix or to other write components during formation of a pattern in the medium. FIG. 4 shows a multifunctional write component 44. Multifunctional write component 44 is capable of bonding to the matrix 40 through pendent functional moieties 42 or to other write components 44. The write components 44 may have separate reactive groups for binding to the matrix and to other write components, or these reactive groups may be essentially equivalent, as in a dimerization.

Figure 5:
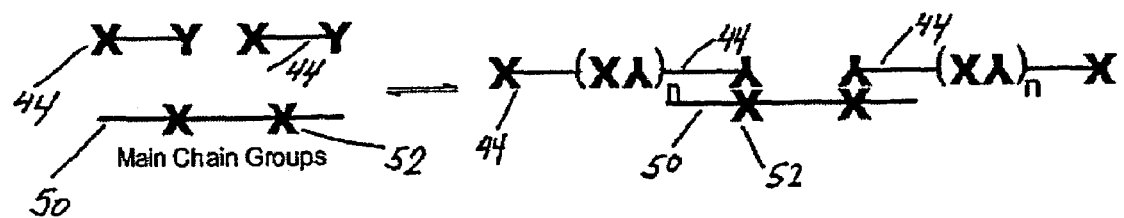
FIG. 5 is a diagram of a multifunctional write component that can bind to functional moieties that are part of the matrix or to other write components.

FIG. 5 shows a multifunctional write component 44 that binds to the matrix 50 through main chain functional moieties 52 or to other write components 44. Again, the write components 44 may have separate reactive groups for binding to the matrix and to other write components, or these reactive groups may be the same.

Preferably, the matrix contains functional moieties to which the write components can bind. Preferably, the proportion of functional moieties within the matrix to the number of write component reactive groups is controlled. The precise ratio of function moieties to write components groups is dependent upon how much matrix attachment occurs relative to the amount of polymerization. However, preferably, the proportion of matrix functional moieties to write component reactive groups within the medium is at least 0.1. More preferably, the proportion of matrix functional moieties to write component reactive groups within the medium is at least 1. Most preferably, the proportion of matrix functional moieties to write component reactive groups within the medium is at least 5.

Suitable write components include molecules containing C—C double bonds that undergo any of the various types of reversible photocycloaddition reactions. These can include anthracenes, acenaphthylenes, phenanthrenes, and related polyaromatic hydrocarbons, photodiene formation/Diels Alder reaction, and concerted and nonconcerted ene-ene reactions (2+2, 4+4, 4+2, 3+2, etc.). Also, metal and organic salts can be attached to photochelating groups, such as spiro compounds, chromenes, and the like. Nucleotides, such as DNA and RNA, can also be attached to such compounds via strong hydrogen bonding interactions. Polymer bound metal complexes can be used as attachment sites for photoinsertion of various ligands. Molecules used as photoinitiators for polymerization reactions can instead be bound to groups, such as C—C double bonds, incorporated in a matrix. Thiols, selenols, tellenols, disulfides, diselenides, ditellurides, and various photoiniferters can be bound to matrix incorporated enes as well. It should be understood that for most of these addition reactions it is possible to reverse which group serves as the matrix functional moiety, and which serves as the free write component. This list should in no way be construed as complete. It is also possible for a single write component molecule (or monomer) to contain more than reactive functional group.

Preferably, the write components react during hologram formation by a cycloaddition reaction. There are a variety of cycloaddition reactions that yield rings of different size, and that can be reversed using light of shorter wavelength than the wavelength first used to react the components or using heat. Four-member rings (cyclobutanes) can be formed by (2+2) cycloadditions, and 8-membered rings can be formed by (4+4) cycloadditions.

Anthracenes, which are an example of species that undergo (4+4) cycloaddition reactions, are a more preferred type of write component. Anthracenes typically posses a high refractive index and undergo forward and reverse reactions with a high quantum efficiency and minimal side reactions. Further, the forward and reverse photoreactions are red-shifted into visible wavelengths relative to many of the (2+2) cycloadditions.

Figure 6:
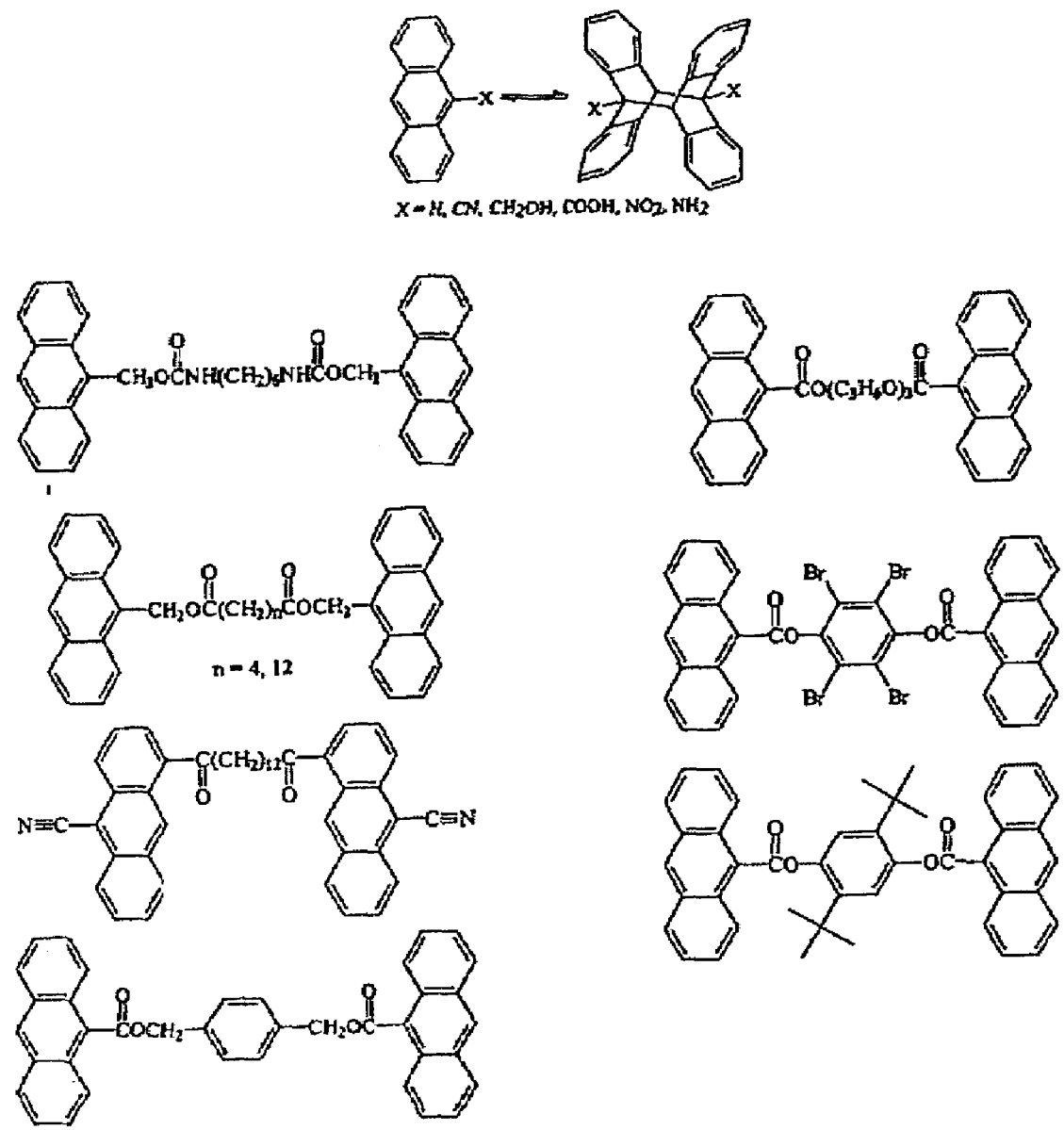
FIG. 6 is a diagram of preferred mono-anthracenes bis-anthracenes that can be used for rewriteable optical articles.

FIG. 6 illustrates an example of preferred mono-anthracenes and the reversible reactions they will undergo. In addition, several preferred bis-anthracenes that can be used for rewriteable holography are illustrated.

The photoaddition reactions that the write components undergo to form the holograms may be reversed by several different methods depending upon the specific write component chosen. Preferred methods of reversing these reactions include irradiation of the medium with light of a different wavelength than the wavelength used to write the hologram to the medium, heating the medium (for example by using an IR laser), or by electrochemical means.

The write component species may be comprised entirely of reactive groups that bond to the matrix during or to other write components during writing of the data to the medium. Alternatively, the write component species may comprise additional moieties that impart various attributes to the write component species. These attributes can, for example, include increasing the refractive index of the write component, shifting the absorption wavelength of the write component, and/or increasing the solubility of the write component in the matrix.

Formation of a hologram, waveguide, or other optical article relies on a refractive index contrast (Δn) between exposed and unexposed regions of a medium. The high refractive index contrast of the medium is do, at least partly, to diffusion of the write component to exposed regions. When a medium is exposed during formation of a pattern, the write component in the exposed regions is consumed by bonding to the matrix and/or bonding to other write components in the region. Unreacted write components from unexposed regions of the matrix can diffuse to the exposed regions of matrix as the write component is consumed. If the write component has a different refractive index than the matrix, diffusion of the write component from the unexposed regions will increase the contrast between exposed and unexposed regions of a medium.

High index contrast is desired because it provides improved signal strength when reading a hologram, and provides efficient confinement of an optical wave in a waveguide. One way to provide a high index contrast between the matrix and the write component is to use a write component having moieties (referred to as index-contrasting moieties) that are substantially absent from the matrix, and that exhibit a refractive index substantially different from the index exhibited by the bulk of the matrix. For example, high contrast would be obtained by using a matrix that contains primarily aliphatic or saturated alicyclic moieties and light nonpolarizable atoms (e.g. F, O, B; providing low index) and a photoactive monomer made up primarily of aromatic groups or conjugated double bond systems and heavy polarizable atoms (e.g. S, Se, Te, Br, I; providing high index).

In addition to the write component, the optical articles may contain a photosensitizer (the photosensitizer, the write component, and the matrix functional moieties being part of the overall photoimageable system). The photosensitizer, upon exposure to relatively low levels of recording light, instigates the binding of the write component to the matrix or to other write components, avoiding the need for direct light-induced bonding of the write component. The photosensitizer functions by absorbing light and entering an excited state. The absorbed photon energy is then transferred from the photosensitizer to either a write component or a matrix functional moiety to induce reaction of the write components to the functional moiety and thereby return the photosensitizer to its ground state. The photosensitizer is then free to initiate binding of additional write components by absorbing additional photons, hence functioning as a catalyst. A photosensitizer enables tuning of the writing wavelength and control of the absorptivity of the media at the writing wavelength. Typically, 0.01 to 5 wt. % photosenstizer, based on the overall media weight, provides desirable results. Applicable photosenstizers can be chosen from a knowledge of photochemistry, the chemical literature, and the Handbook of Photochemistry (Steven Murov, Marcel Dekker, 1973).

Preferably, the reaction by which the matrix component is polymerized to form the matrix is independent from reactions by which the write components and matrix components react during writing of a pattern, e.g., data. Media which utilizes a matrix component that reacts to form the matrix and a write component that reacts by non-independent reactions often experience substantial cross-reaction between the precursor and the write component during the matrix cure (e.g., greater than 20% of the write component is reacted or incorporated into the matrix after cure), or other reactions that inhibit polymerization of the write component. Cross-reaction tends to undesirably reduce the refractive index contrast between the matrix and the write component. In addition, cross reaction reduces the amount of write component that can bind to the matrix during writing of a pattern and reduces the number of sites on the matrix that can be bonded to during writing of the pattern.

To be independent, preferably the matrix precursor and the write component are selected such that: (a) the reaction to form the matrix and the reaction to bind the write component to the matrix during formation of a pattern proceed by different types of reaction intermediates, (b) neither the matrix intermediate nor the conditions by which the matrix is polymerized will induce substantial reaction of the write component.

A holographic recording medium of the invention can be formed by adequately supporting the photorecording material, such that holographic writing and reading is possible. Typically, fabrication of the medium involves depositing the matrix precursor/write component mixture between two plates. The plates are typically glass, but it is also possible to use other materials transparent to the radiation used to write data, e.g., a plastic such as polycarbonate, poly(methyl methacrylate), or amorphous polyolefin. It is possible to use spacers between the plates to maintain a desired thickness for the recording medium. During the matrix cure, it is possible for shrinkage in the material to create stress in the plates, such stress altering the parallelism and/or spacing of the plates and thereby detrimentally affecting the medium's optical properties. To reduce such effects, it is useful to place the plates in an apparatus containing mounts, e.g., vacuum chucks, capable of being adjusted in response to changes in parallelism and/or spacing. In such an apparatus, it is possible to monitor the parallelism in real-time by use of a conventional interferometric method, and make any necessary adjustments during the cure. Such a method is discussed, for example, in U.S. patent application Ser. No. 08/867,563, the disclosure of which is hereby incorporated by reference.

The photorecording material of the invention is also capable of being supported in other ways. For instance, it is conceivable to dispose the write component (and other components) into the pores of a substrate, e.g., a nanoporous glass material such as Vycor (Vycor can be functionalized with attachment groups for the write component using agents such as silane coupling agents, or matrix precursors can be infused and polymerized within the pores.). More conventional polymer processing is also invisioned, e.g., closed mold formation or sheet extrusion. A stratified medium is also contemplated, i.e., a medium containing multiple substrates, e.g., glass, with layers of photorecording material disposed between the substrates.

The medium of the invention is then capable of being used in a holographic system, such as discussed previously. The amount of information capable of being stored in a holographic medium is proportional to the product of: the refractive index contrast, Δn, of the photorecording material, and the thickness, d, of the photorecording material. (The refractive index contract, Δn, is conventionally known, and is defined as the amplitude of the sinusoidal variations in the refractive index of a material in which a plane-wave, volume hologram has been written. The refractive index varies as: $n(x)=n_0+\Delta n \cos(K_x)$, where n(x) is the spatially varying refractive index, x is the position vector, K is the grating wavevector, and $n_0$ is the baseline refractive index of the medium. See, e.g., P. Hariharan, *Optical Holography: Principles, Techniques, and Applications*, Cambridge University Press, Cambridge, 1991, at 44).

The Δn of a material is typically calculated from the diffraction efficiency or efficiencies of a single volume hologram or a multiplexed set of volume holograms recorded in a medium. The Δn is characteristic of a medium before writing, but is observed by measurement performed after recording. Advantageously, the photorecording material of the invention is capable of exhibiting a Δn of $3 \times 10^{-3}$ or higher.

If the media is a rewriteable type media, preferably, the medium is also capable of exhibiting a Δn of $3 \times 10^{-3}$ or higher after being written to, erased and then being rewritten to again. Preferably, the reduction of Δn in subsequent rewrite cycles is controlled.

Examples of other optical articles include beam filters, beam steerers or deflactors, and optical couplers. (See, e.g., L. Solymar and D. Cooke, *Volume Holography and Volume Gratings*, Academic Press, 315-327 (1981), the disclosure of which is hereby incorporated by reference.) A beam filter separates part of an incident laser beam that is traveling along a particular angle from the rest of the beam. Specifically, the Bragg selectivity of a thick transmission hologram is able to selectively diffract light along a particular angle of incidence, while light along other angles travel undeflected through the hologram. (See, e.g., J. E. Ludman et al., "Very thick holographic nonspatial filtering of laser beams," *Optical Engineering*, Vol. 36, No. 6, 1700 (1997), the disclosure of which is hereby incorporated by reference.) A beam steerer is a hologram that deflects light incident at the Bragg angle. An optical coupler is typically a combination of beam deflectors that steer light from a source to a target. These articles, typically referred to as holographic optical elements, are fabricated by imaging a particular optical interference pattern within a recording medium, as discussed previously with respect to data storage. Medium for these holographic optical elements are capable of being formed by the techniques discussed herein for storage media or waveguides.

Preferably, the optical article is flood cured once one or more interference patterns are recorded to the article. An optical article is flood cured by exposing the whole optical article to an intense light beam of a wavelength that causes the optically active species within the matrix to react. Flood curing ensures that all write components and reactive matrix components have reacted so that no changes to the interference patterns occur when reading the recorded interference patterns.

As mentioned previously, the material principles discussed herein are applicable not only to hologram formation, but also to formation of optical transmission devices such as waveguides. Polymeric optical waveguides are discussed for example in B. L. Booth, "Optical Interconnection Polymers," in *Polymers for Lightwave and Integrated Optics, Technology and Applications*, L. A. Hornak, ed., Marcel Dekker, Inc. (1992); U.S. Pat. Nos. 5,292,620;and 5,219,710,the disclosures of which are hereby incorporated by reference. Essentially, the recording material of the invention is irradiated in a desired waveguide pattern to provide refractive index contrast between the waveguide pattern and the surrounding (cladding) material. It is possible for exposure to be performed, for example, by a focused laser light or by use of a mask with a non-focused light source. Generally, a single layer is exposed in this manner to provide the waveguide pattern, and additional layers are added to complete the cladding, thereby completing the waveguide. The process is discussed for example at pages 235-36 of Booth, supra, and Cols. 5 and 6 of U.S. Pat. No. 5,292,620. A benefit of the invention is that by using conventional molding techniques, it is possible to mold the matrix/photoimageable system mixture into a variety of shapes prior to matrix cure. For example, the matrix/photoimageable system mixture is able to be molded into ridge waveguides, wherein refractive index patterns are then written into the molded structures. It is thereby possible to easily form structures such as Bragg gratings. This feature of the invention increases the breadth of applications in which such polymeric waveguides would be useful.

The invention will be further clarified by the following examples, which are intended to be exemplary.

EXAMPLE 1

The following is an example of a holographic storage medium in which the write components bind to the matrix during the recording of a hologram. The holographic medium has a matrix with anthracenyl pendent functional groups and free 9-anthracenecarbonitrile as the write component. The holographic medium was formed from the following components in the stated proportions wt %:

| | |
|---|---|
| Desmodur N3200 | 49.0% |
| Ethylene glycol | 6.8% |
| N,N-Dimethylformamide (DMF) | 37.7% |
| 9-Anthracenemethanol (9AM) | 3.9% |
| 9-Anthracenecarbonitrile (9ACN) | 1.9% |
| Dibutyltin dilaurate | 0.7% |

The holographic storage medium was formed by mixing all of the components except for the dibutyltin dilaurate together until homogeneous. The dibutylin dilaurate was then mixed in with the other components. The medium was then prepared by placing the mixture between two substrates.

The matrix was formed by reacting the polisocyanate and ethylene glycol in the mixture to form a polyurethane matrix. The polyurethane cure was accomplished thermally between the two substrates while being catalyzed by the dibutyltin dilaurate.

DMF is a plasticizing agent that is considered a matrix component in regards to its contribution to the refractive index modulation created during hologram writing. This plasticizizer enables improved diffusion of the write component and quicker hologram formation. 9AM is a pendent functional group on the polyurethane matrix that attaches with the isocynate during matrix curing. 9ACN is the free write molecule that attaches (binds) to the 9AM pendent group of the matrix during hologram writing. 9AM groups also bind with each other during writing and contribute to hologram formation.

Figure 7:
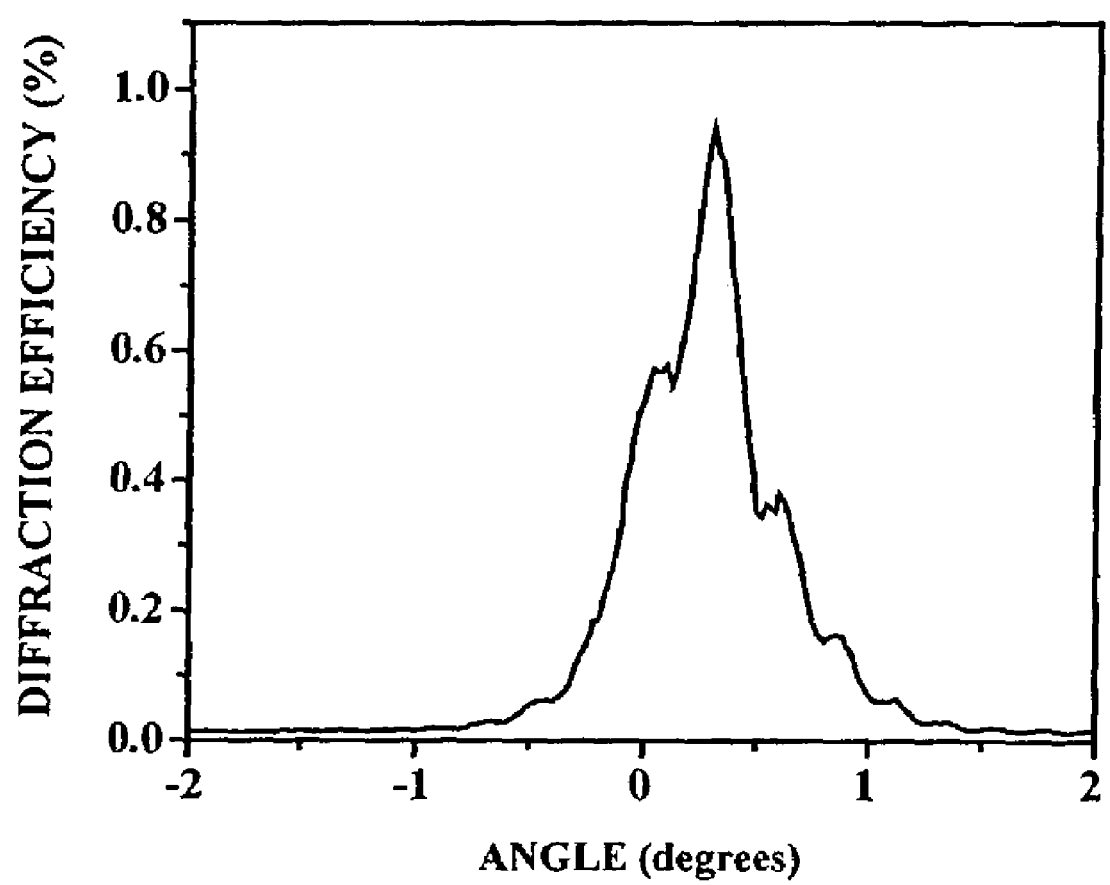
FIG. 7 is a diagram of Diffraction Efficiency v Angle for the optical article of Example 1 using the interference of two 407 nm laser beams.

FIG. 7 shows a hologram of diffraction efficiency 1% formed in this media using the interference of two 407 nm laser beams. As shown in FIG. 7, the 9ACN absorbs the light strongly and the 9AM pendent groups absorbs it weekly.

EXAMPLE 2

The following is an example of a rewriteable media. The rewriteable media uses a matrix attachment approach in which the write components are able to bind to the matrix. The holographic medium has a matrix with anthracenyl pendent functional groups and a write components with free 9-anthracenecarbonitrile. The holographic medium was formed from the following components in the stated proportions: wt %

| | |
|---|---|
| Desmodur N3200 | 49.8% |
| Ethylene glycol | 7.2% |
| N,N-Dimethylformamide (DMF) | 38.1% |
| 9-Anthracenemethanol (9AM) | 3.9% |
| 9-Anthracenecarbonitrile (9ACN) | 0.3% |
| Dibutyltin dilaurate | 0.7% |

The holographic storage medium was formed by first mixing all of the components except for the dibutyltin dilaurate together until homogeneous. The dibutylin dilaurate catalyst was then mixed in with the other components. The medium was then prepared by placing the mixture between two substrates.

The matrix was formed by reacting the polisocyanate and ethylene glycol in the mixture to form a polyurethane matrix. The polyurethane cure was accomplished thermally between the two substrates while being catalyzed by the dibutyltin dilaurate.

DMF is a plasicizing agent and cosolvent that is considered a matrix component in regards to its contribution to the refractive index modulation created during hologram writing. This plasticizer enables improved diffusion of the write component and quicker hologram formation. 9AM is a pendent functional group on the polyurethane matrix that attaches with the isocyanate during matrix curing. 9ACN is the free write molecule that attaches (binds) to the 9AM pendent group of the matrix during hologram writing. 9AM groups also bind with each other during writing and contribute to hologram formation.

Figure 8:
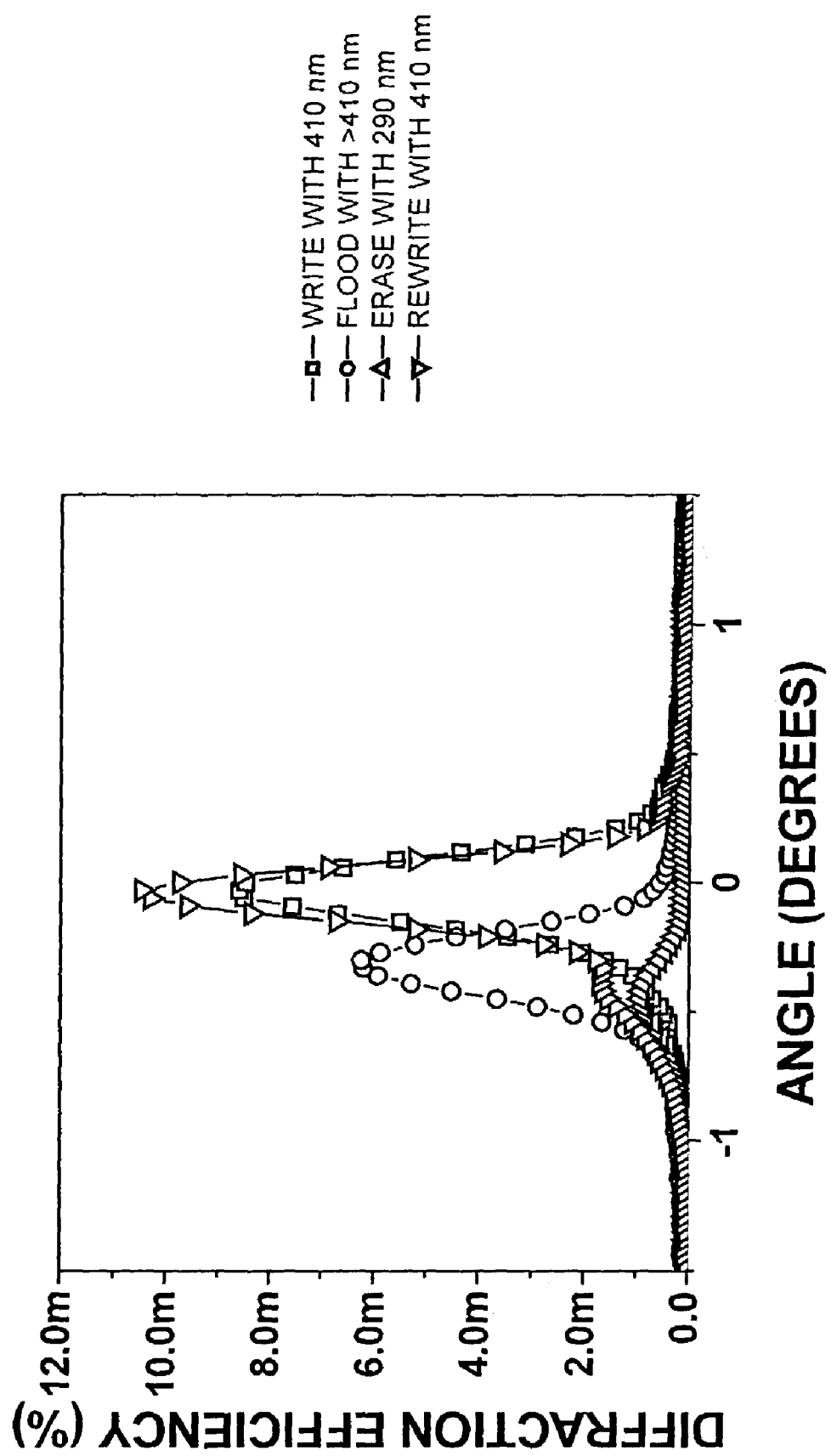
FIG. 8 is a diagram of Diffraction Efficiency v Angle for the optical article of Example 2. The example shows the Diffraction Efficiency for one complete cycle of writing to the optical article, flood curing the optical article, erasing the optical article and rewriting to the optical article.

FIG. 8 shows the diffraction efficiency of one hologram write-erase-rewrite cycle using the media of Example 1. In FIG. 8, a hologram is first written to the media hologram of diffraction efficiency 0.0085% formed in this media using the interference of two 410 nm laser beams.

In this media, the 9ACN absorbs the light strongly and the 9AM pendent groups absorbs it weekly, hence ensuring preferential reaction of 9ACN with matrix 9AM rather than reaction of 9AM groups with each other. To ensure virtually complete reaction of the monomers, the sample is then flood cured with blue light to bind all remaining unreacted anthracenes (9AM and 9ACN) that can react. Flood curing causes some washing out of the hologram, which is evident by the reduced diffraction efficiency following the flood curing (and a slight angle shift). Attempting to write to the media using a 410 nm laser at this time results in no new hologram and negligible change in the original hologram. The hologram is then erased using UV light from a mercury arc lamp passed through an interference filter having a peak transmission of 290 nm and a bandwidth of 10 nm at half height. After erasing the media has a maximum diffraction efficiency of 0.0010%. After erasing the original hologram a new hologram is rewritten to the media using a 410 nm laser. The rewritten hologram has a maximum diffraction efficiency of 0.0105%. Accordingly, the maximum diffraction efficiency between the original hologram and the rewritten hologram is +0.02%. Meaning the rewritten hologram was actually stronger than the original hologram.

Having now fully described this invention, it will be appreciated by those skilled in the art that the invention can be performed within a wide range of parameters within what is claimed, without departing from the spirit and scope of the invention.

The invention claimed is:

1. A holographic storage optical article comprising:
a matrix formed in situ using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid inorganic/organic networks, comprising functional moieties capable of binding to write components; and
write components, wherein the write components can be reacted to reversibly bind to functional moieties pendant upon or within the matrix backbone to form a pattern within the optical article when the holographic storage article is exposed to an interference pattern and wherein the write components are not bonded to the matrix and are able to diffuse through the matrix prior to reversibly binding to the matrix to form the pattern, and the holographic storage optical article is rewriteable and is configured to store holographic data and have holographic data retrieved from the article.

2. The optical article of claim 1, wherein the write components comprise an anthracenes.

3. The optical article of claim 1, wherein the reversible binding of the write components to the matrix is a cycloaddition reaction.

4. The optical article of claim 1, wherein the binding of the write components to the matrix can be reversed by exposing the optical article to light of a different wavelength than was used to bind the write components to the matrix.

5. The optical article of claim 1, wherein the pattern formed within the optical article is a refractive index modulation pattern.

6. The optical article of claim 1, wherein the matrix comprises an organic or inorganic polymer or glass.

7. The optical article of claim 1, wherein the write components contain reactive groups that reversibly bind to functional moieties of the matrix when the optical article is exposed to an interference pattern and wherein the proportion of the matrix functional moieties to write component reactive groups within the medium is at least 1:10.

8. The optical article of claim 1, wherein the optical article contains a photosensitizer that induces the binding of the write components to the matrix.

9. The optical article of claim 1, wherein the optical article is a holographic storage medium.

10. The optical article of claim 1, wherein the write components bind to the matrix functional moieties via a dimerization or cycloaddition reaction.

11. A method of rewritable pattern formation within an optical article, comprising:
writing an interference pattern comprising first data to the optical article by exposing the optical article to a first interference pattern, wherein the interference pattern is formed by bonding write components to a matrix comprising functional moieties that are pendant upon or within the matrix backbone and are capable of binding to write components and wherein the write components are not bonded to the matrix and are able to diffuse through the matrix prior to binding to the matrix to form the interference pattern, and wherein the matrix is formed using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid inorganic/organic networks;

erasing the data by exposing the article to a predefined condition;

writing a second interference pattern comprising second data to the optical article by exposing the optical article to a second interference pattern; and reading the second data from the optical article.

12. The method of claim 11, wherein the optical article comprises anthracenes.

13. The method of claim 11, wherein the predefined condition is exposure to light of a different wavelength than was used during the flood curing.

14. The method of claim 11, wherein the predefined condition is heat.

15. The method of claim 11, wherein the optical article has a Δn of $3 \times 10^{-3}$ or higher after being exposed to the second interference pattern.

16. The method of claim 11, wherein the optical article is a holographic storage medium.

17. The method of claim 11, further comprising flood curing the optical article by exposing the optical article to light after writing an interference pattern.

18. The method of claim 11, wherein the write components bind to the matrix functional moieties via a dimerization or cycloaddition reaction.

19. A method of manufacturing an optical article, comprising:

mixing a matrix precursor and a write component together; and reacting the matrix precursor to form a matrix using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid norganic/organic networks, wherein the matrix contains functional moieties that are pendant upon or within the matrix backbone to which the write component can bind when the optical article is exposed to an interference pattern, the write components are not bonded to the matrix and are able to diffuse through the matrix prior to exposure to the interference pattern, the write components can react by reversible cycloadditions, and the optical article is rewriteable and is configured to store holographic data and have holographic data retrieved from the article.

20. The method of claim 19, wherein the write components comprise anthracenes.

21. The method of claim 19, wherein the optical article further comprises a photosensitizer.

22. The method of claim 19, wherein the optical article is a holographic storage medium.

23. An optical article comprising:

a matrix formed in situ using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid inorganic/organic networks, comprising functional moieties that are pendant upon or within the matrix backbone and are configured to bind to write components; and write components, wherein the write components bind to the matrix to form a pattern when exposed to an interference pattern and wherein the write components are not bonded to the matrix and are able to diffuse through the matrix prior to binding to the matrix to form the pattern, and the holographic storage optical article is rewriteable and is configured to store holographic data and have holographic data retrieved from the article.

24. The optical article of claim 23, wherein the pattern formed within the optical article is a refractive index modulation pattern.

25. The optical article of claim 23, wherein the matrix comprises an organic or inorganic polymer or glass.

26. The optical article of claim 23, wherein the functional moieties are part of a polymer backbone that forms the matrix.

27. The optical article of claim 23, wherein the functional moieties are attached to the matrix as pendent groups.

28. The optical article of claim 23, wherein the write components contain reactive groups that bind to the functional moieties of the matrix when the optical article is exposed to an interference pattern and wherein the proportion of matrix functional moieties to write component reactive groups within the medium is at least 1:10.

29. The optical article of claim 23, wherein the write components contain reactive groups that bind to the functional moieties of the matrix or to another write component.

30. The optical article of claim 23, wherein the optical article contains a photosensitizer that induces the binding of the write components to the matrix.

31. The optical article of claim 23, wherein the optical article is a holographic storage medium.

32. The optical article of claim 23, wherein the $T_g$ of the optical article is between 80° C. and −130° C.

33. The optical article of claim 23, wherein the write components bind to the matrix functional moieties via a dimerization or cycloaddition reaction.

34. A method of forming a pattern within an optical article, comprising:

exposing an optical article to an interference pattern, wherein write components within the optical article bind to a matrix comprising functional moieties that are pendant upon or within the matrix backbone and are capable of binding to write components to record the interference pattern, the write components are not bonded to the matrix and are able to diffuse through the matrix prior to binding to the matrix to form the pattern, the matrix is formed using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid inorganic/organic networks and the holographic storage optical article is rewriteable and is configured to store holographic data and have holographic data retrieved from the article.

35. The method of claim 34, wherein the pattern formed within the optical article is a refractive index modulation pattern.

36. The method of claim 34, wherein the matrix comprises an organic or inorganic polymer or glass.

37. The method of claim 34, wherein the functional moieties are part of a polymer backbone that forms the matrix.

38. The method of claim 34, wherein the functional moieties are attached to the matrix as pendent groups.

39. The method of claim 34, wherein the write components contain reactive groups that bind to the functional moieties of the matrix when the optical article is exposed to an interference pattern and wherein the proportion of matrix functional moieties to write component reactive groups within the medium is at least 1:10.

40. The method of claim 34, wherein the write components contain reactive groups that bind to the functional moieties of the matrix or to another write component.

41. The method of claim 34, wherein the optical article contains a photosensitizer that induces the binding of the write components to the matrix.

42. The method of claim 34, wherein the optical article is a holographic storage medium.

43. The method of claim 34, wherein the $T_g$ of the optical article is not more than 50° C. above the temperature at which the pattern is formed.

44. The method of claim 34, wherein the write components bind to the matrix functional moieties via a dimerization or cycloaddition reaction.

45. A method of manufacturing an optical article, comprising:
   mixing a matrix precursor and a write component together; and
   reacting the matrix precursor to form a matrix using one of cationic epoxy polymerization, cationic vinyl ether polymerization, cationic alkenyl ether polymerization, cationic alkyl ether polymerization, cationic ketene acetal polymerization, epoxy-amine step polymerization, epoxy-mercaptan step polymerization, unsaturated ester-amine step polymerization (via Michael addition), unsaturated ester-mercaptan step polymerization (via Michael addition), vinyl-silicon hydride step polymerization (hydrosilylation), isocyanate-hydroxyl step polymerization (urethane formation), isocyanate-amine step polymerization (urea formation), Diels-Alder step polymerization, anionic polymerization of cyanoacrylates and sol-gel reactions to form inorganic or hybrid inorganic/organic networks, wherein the matrix contains functional moieties that are pendant upon or within the matrix backbone and are to which the write component can bind when the optical article is exposed to an interference pattern, the write components are not bonded to the matrix and are able to diffuse through the matrix prior to binding to the matrix to form the pattern, and the holographic storage optical article is rewriteable and is configured to store holographic data and have holographic data retrieved from the article.

46. The method of claim 45, wherein the matrix comprises an organic or inorganic polymer or glass.

47. The method of claim 45, wherein the functional moieties are part of a polymer backbone that forms the matrix.

48. The method of claim 45, wherein the functional moieties are attached to the matrix as pendent groups.

49. The method of claim 45, wherein the write components contain a reactive group that binds to the functional moieties of the matrix when the optical article is exposed to an interference pattern and wherein the proportion of matrix functional moieties to write component reactive groups within the medium is at least 1:10.

50. The method of claim 45, wherein the write components contain a reactive group that binds to the functional moieties of the matrix or to another write component.

51. The method of claim 45, wherein the optical article contains a photosensitizer that induces the binding of the write component to the matrix.

52. The method of claim 45, wherein the optical article is a holographic storage medium.

53. The method of claim 45, wherein the write components bind to the matrix functional moieties via a dimerization or cycloaddition reaction.

* * * * *